United States Patent Office 3,605,538
Patented Sept. 20, 1971

3,605,538
DEVICE FOR POSITIONING PLATE FOR CUTTING BY A CROSSCUT SHEAR
Bruno Bohmer, Dusseldorf, Josef Schiffers, Monchen Gladbach-Rheindahlen, and Rainer Kuhnpast, Dusseldorf, Germany, assignors to Schloemann Aktiengesellschaft, Dusseldorf, Germany
Filed May 21, 1969, Ser. No. 826,483
Claims priority, application Germany, May 30, 1968, P 17 52 465.1; Oct. 8, 1968, P 18 01 689.2
Int. Cl. B26d 5/40
U.S. Cl. 83—206                              19 Claims

ABSTRACT OF THE DISCLOSURE

The invention relates to a device for advancing the end portion of a length of plate which is to be cut by a crosscut shear, the device comprising a primary conveying means for normally moving the plate, and a pushing means which moves from outside the path of movement of the plate to engage the end portion of the plate while the end portion is still entrained by the primary conveying means, and then to advance the plate.

---

Figure 1:
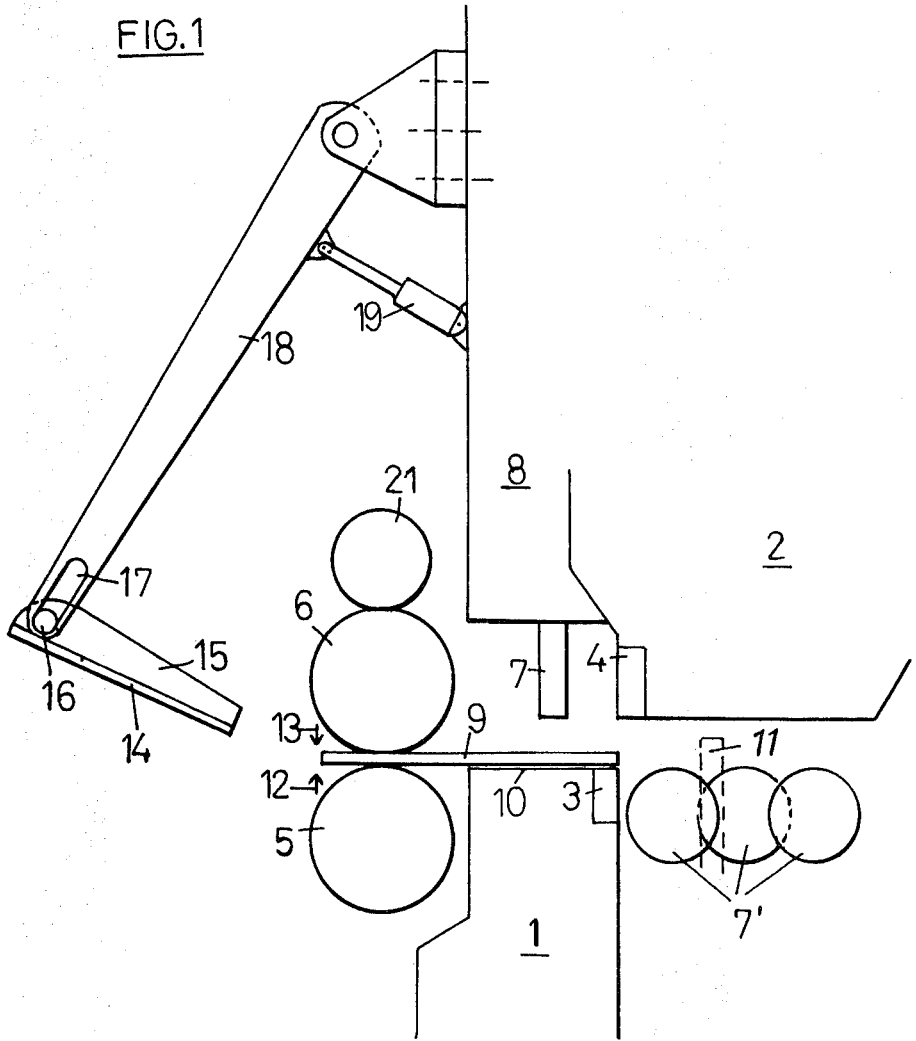

The invention relates to a device for cutting a given length of plate by a crosscut shear, wherein the plate to be cut is conveyed downstream in the direction of the crosscut shear.

In this specification the term plate is used generally to include sheet and strip metal.

Such crosscut shears are used to cut rolled sheet metal or plate so as to produce panels of predetermined lengths. However, the useful length of the continuous plate always shows certain variations so that it is generally not possible, even making full use of the permissible length tolerances of plate, to divide the whole length of plate into panels of the same length. At the end there then occurs a panel of a length that cannot be used for the planned production process. As the drive rollers or similar conveying means carrying the plate cannot be brought up as closely as desired to the cutting line of the shears, the panels unusable for this reason may, depending on the specified length, be either too long or too short, so that the conveying means can no longer manage to convey them. Bringing up the last piece of the plate to the shears by hand is not only very time-consuming, but also very inaccurate, because the end edge of the plate may not be straight and parallel to the shear cutting line, but rough and uneven. Therefore the end edge cannot be brought parale to the cutting line of the shear blade either by a contact rule or by eye. Nevertheless the end pieces of a plate, assuming certain minimum lengths, are of considerable economic value. For example, they can be cut into smaller lengths, so as to obtain pieces of plate that can be used in other departments. Such cutting of the end pieces of plate was either not possible or else caused considerable difficulties with previous cross-cut shears.

According to the invention, there is provided a device for positioning end portions of plate to be cut by a crosscut shear, comprising a primary conveying means, pushing means for moving the plate end portion downstream to the shear, said pushing means moving to operate, whilst the plate is supported by the primary conveying means, from a position of rest outside the path in which the plate is conveyed to abut or engage the end portion of the plate and a plate holding means for holding the plate until the pushing means abut or engage the plate.

A crosscut shear having the device according to the invention may receive end portions of plate which are positioned with high precision, without much loss of time and without great risk of accident. With such a device it is possible to continue the movement of the plate even when the remaining length of the last piece of the plate is smaller than the distance between the exit from the conveying means and the cutting line of the crosscut shear. Therefore economically useful cut lengths can be obtained from the last piece of plate.

Preferably, at least two pushing means are used, which are independently movable to abut or engage the plate. The distance between a pair of pushing means can be adjustable, so that plates of different widths can be accommodated.

The pushing means can operate in unison to move the plate.

The use of the above preferred features allows for the fact that the end edge of the plate is frequently uneven as already described, so that a single pushing means, if no longitudinal guides are provided, would twist the plate. The plurality of pushing means can each abut or engage the end portion of the plate, as during this time the plate is preferably held immobile by the holding means, and cannot be displaced under the effect of the contact forces of the pushing means. Once the plurality of pushing means have taken up their position in accordance with the individual conditions of a plate end, their preferably common drive can ensure that the plate to be cut will continue to be pushed completely parallel to the required path.

The processes described are preferably automatically controlled. For this purpose there is arranged, preferably before the exit from the conveying means, for example before the last pair of conveying rollers, a sensor which gives a pulse when the end of the plate enters its field of reception. With the help of this pulse and switching and positioning means the conveying means is switched off and the independent movement of the pushing means continues until they rest against the plate end and the holding means is actuated. With the help of a further sensor, which for example can be provided by a time relay, the dependent movement of the pushing means is started and the holding means released. To set the required length to be cut, a measuring element is preferably coupled with the conveying means, and its pulse controls the crosscut shear. If the conveying means is always stopped during the movement of the pushing means, the measuring elements may also be coupled with the pushing means. The measuring element is preferably provided with an adjustment possibility for different cut lengths, which are to be set as necessary for the cutting of the last piece of plate.

The pushing means can be driven in various ways. According to one embodiment of the invention, it is brought into contact with the conveying means. On the other hand, an independent drive can also be provided for this purpose, in which case it is advisable to connect the pushing means together during their dependent, common travel. If drive rollers are used as the conveying means, according to the invention, they need an adjustment device by means of which they can be controlled into an open and closed position. The signal for the change to the open position the pushing means are displaceably mounted with respect to the primary conveying means on the device, and the device includes means for engaging the primary conveying means and the pushing means when the pushing means engages the end portion of the plate for the transmission of a plate-moving force from the primary conveying means to the pushing means is then always given by the sensor which indicates the end of the plate, while the other sensor or pulse transmitter determines the change to the closed position.

The holding means may be a stop to be fitted behind the shear in the conveying path of the plate. In conjunction with a pushing means driven by drive rollers, it is important that the distance between the stop and the shear cutting line is greater than the distance detected by the sensor, e.g. a light barrier, from the plate end to the centre of the drive rollers. As already described, this stop will be left in its retaining position only until the pushing means are both resting on the uneven rear plate edge. Then the stop is retracted, because the further movement of the plate is ensured and the measuring element controls the cutting processes on the basis of its set length. The holding means may also be a hold-down which presses the plate against the bearing surface of the front knife holder until the pushing means have reached their individual positions against the rear plate edge. In principle either type of holding means can be used with pushing means having their own drive and driven by drive rollers, but the use of a stop when the pushing means is driven by drive rollers is a preferred embodiment because in this way the plate, once the pushing means are resting against its rear edge, can still travel a short distance, within which the drive is transferred to the pushing means and at the end of which any piece of plate that has been moved at a slant as a result of the shape of the rear plate edge is straightened. During this process the plate should no longer be between the drive rollers. This can of course also be done in the case of plate held, for example by a hold-down, by moving the drive rollers in the opposite direction to the direction of the plate until they release the end of the plate and pick up the pushing means. This method however requires a greater expenditure on design.

Preferably, the pushing means comprises a pivotally mounted arm guided in the longitudinal direction of a pivoted lever, whereby rams act on the pivoted lever and more it from its rest to its working position and vice versa. As a result of the pivoting movement and longitudinal guiding, the arm forming the pusher element can adjust itself precisely during its movement to the conveying plane of the plate.

The arm, preferably, is generally L-shaped in cross-section, so that one limb of which, if necessary, can be inserted between the drive rollers and thus provide the drive.

With a separate drive of the pivoted lever, the said lever is arranged on shafts, for whose drive the motor of the drive rollers can advantageously be used, although in view of the radius of the pivoted lever reduction will normally be advisable.

Figure 2:
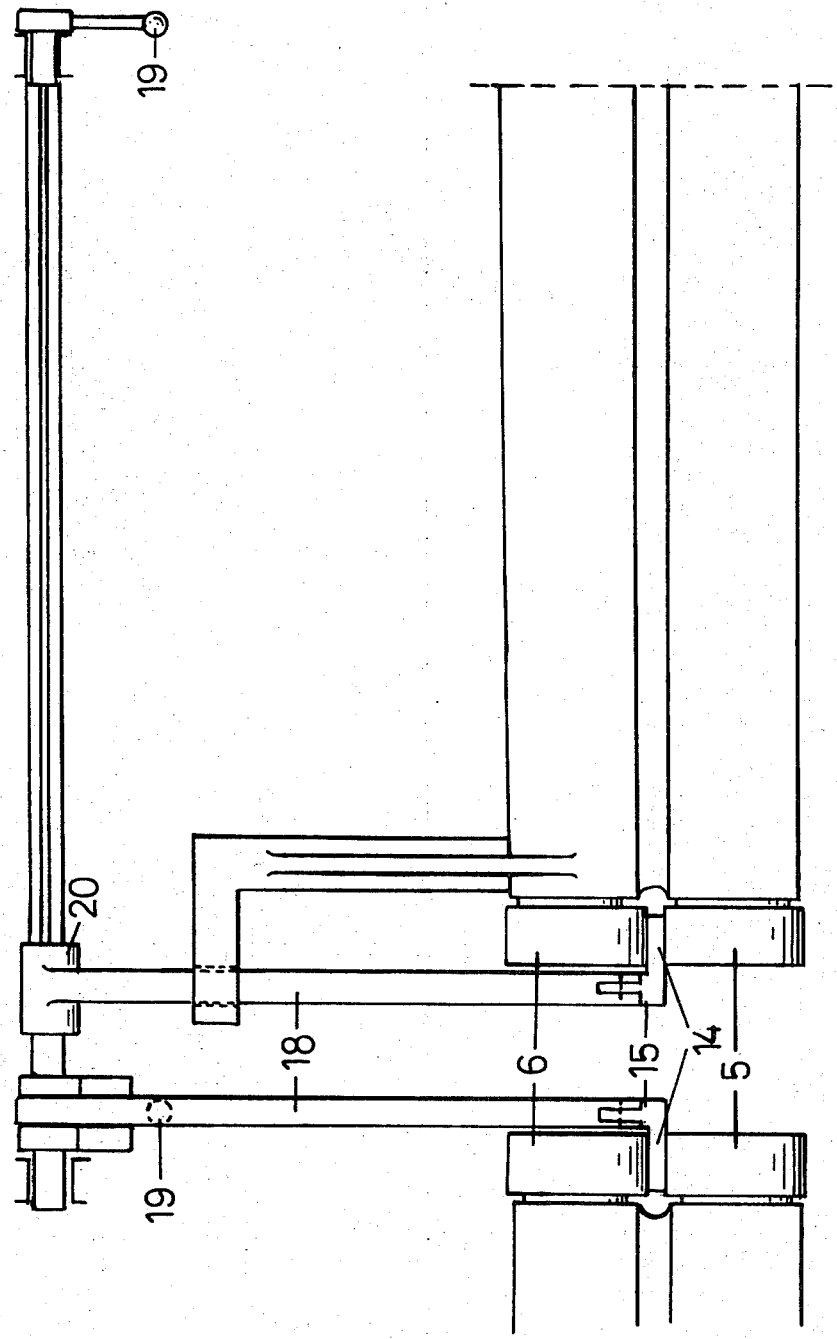
Figure 3:
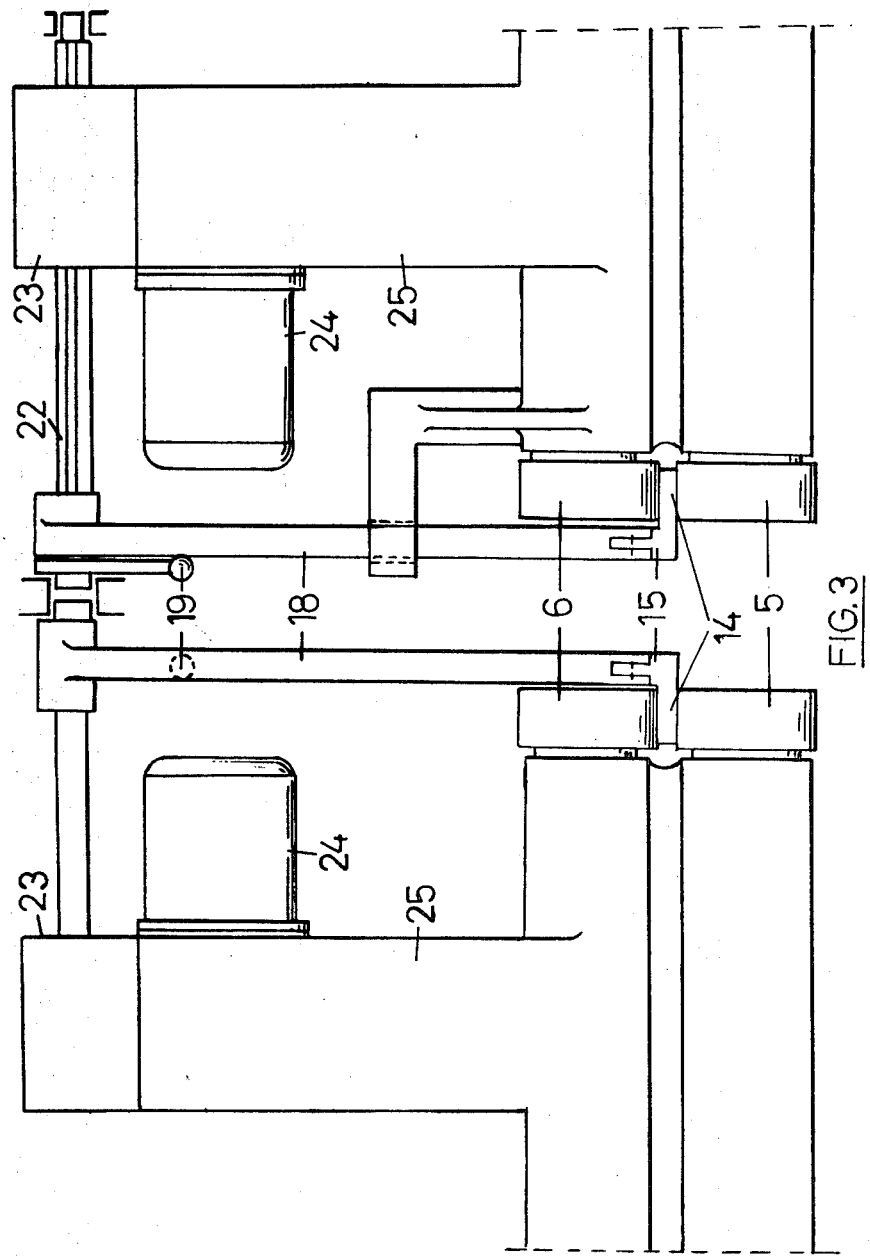
Figure 4:
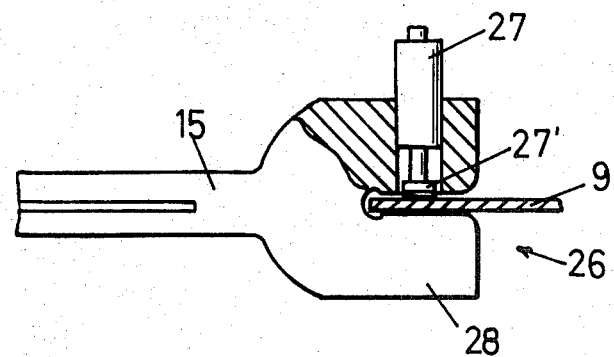
Figure 5:
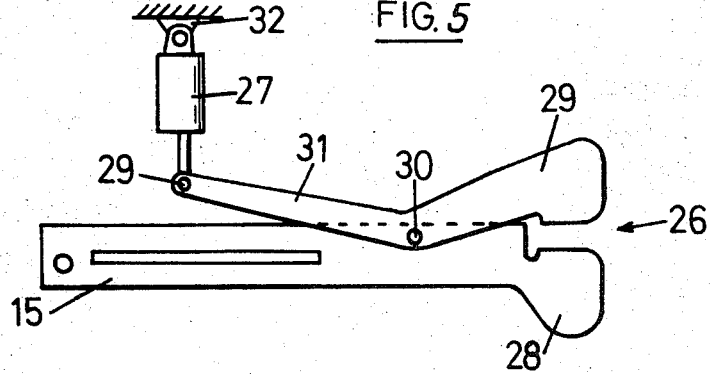
Figure 6:
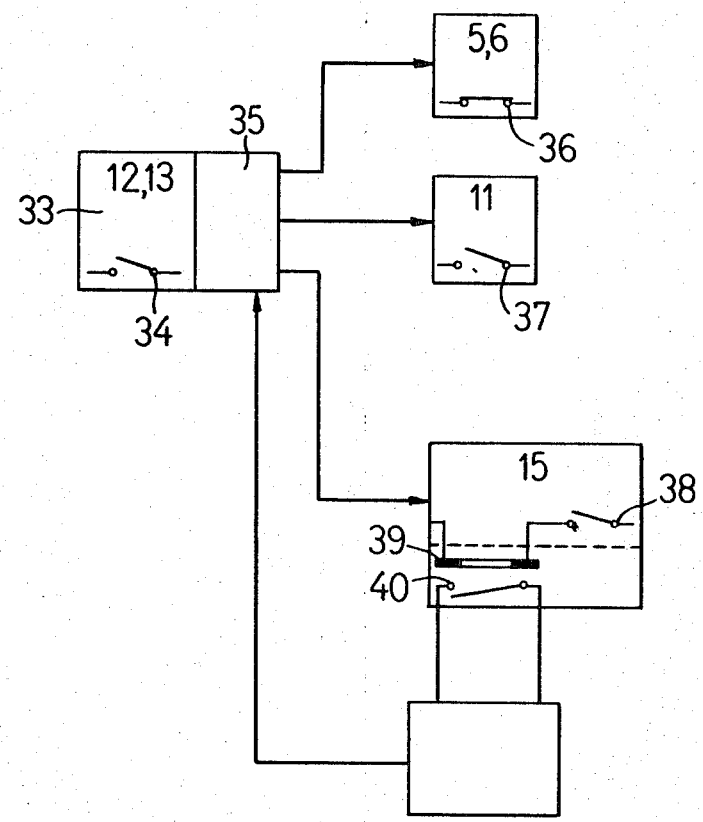

The invention will be further described, by way of example, with reference to the accompanying drawings, of which:

FIG. 1 is a schematic side view of the apparatus;
FIG. 2 is a front view of a first embodiment;
FIG. 3 is a front view of a second embodiment;
FIG. 4 shows clamping device with fixed jaws;
FIG. 5 shows a clamping device with pincer-like jaws; and
FIG. 6 illustrates control means for either embodiment.

As FIG. 1 shows, the shear consists of a bottom knife holder 1 and a top knife holder 2, on the edges of which the bottom shear knife 3 and top shear knife 4 are mounted. In addition, at the entry to the shear there are drive rollers 5 and 6 of the conveying means, usually preceded by a roller table. Behind the cutting line of the shear blades 3 and 4 there are further roller table rollers 7' to remove the cut lengths.

A hold-down 7 is provided, which is movable vertically within the upper frame 8 of the shear and presses the plate 9 onto the bearing surface 10 of the bottom knife holder 1.

Behind the shear cutting line the stop 11 is shown schematically; this is provided in particular when the drive rollers 5 and 6 take over the drive of the pushing means or pusher element.

Just in front of the drive rollers, there is a first sensor comprising a light beam as shown by arrows 12 and 13, by means of which the end of a plate can be detected. To ensure that the cranked limb 14 of the arm 15 can actually be gripped by the drive rollers 5 and 6, the end piece of plate 9, as already described, must still be movable far enough after the preceding cut so that its end edge passes beyond the drive roller axes. Therefore the distance between the stop 11 and the cutting line of the shear knives is greater than the distance from the light beam 12, 13 to the axes of the drive rollers.

The arms 15 have at their ends joint pins 16, which are pivotable and movable in the elongated holes in the pivoted lever 18. On the pivoted lever 18, which can be attached to the upper frame 8, there act rams 19 which can be loaded by a pressure means for control purposes.

The front view in FIG. 2 shows the embodiment in which the arms 15 with their cranked limbs 14 are conveyed by the drive rollers 5 and 6. For purposes of adjustment to varying plate widths, one pair of drive rollers and the bearing block 20 of one pivoted lever 18 are designed to be adjustable in the sideways direction.

In the above described embodiment, the movement of the plate by the drive rollers 5 and 6 is first stopped by a signal from the light beam 12, 13. Then the shear makes a cut which produces a short length. After this the stop 11 is raised, while the drive rollers open and the arms 15 are placed against the rear plate edge by operation of the rams 19 and moved forward until the plate is pressed against the stop 11. Then the drive rollers 5 and 6 close again so that the plate can be moved on. Positioning for cutting is done by the measurement roller 21, which is coupled with one of the drive rollers and can be set to different lengths on the basis of which it controls the shear movement.

In FIG. 3, the pivot arms 18 have an independent drive through shafts 22, which are driven by motors 24 by means of electric clutches 23 through reduction gears not shown in the drawing, the said motors also driving the drive rollers 5 and 6 through the gear 25. In this embodiment, when the arms have reached their individual positions against the rear plate edge as a result of the action of the rams 19, the two electro-clutches 23 are switched on and the hold-down 7, here acting as a holding means, is raised. Then the drive continues with the plate pushed forward straight and a setting means not shown here controls the shear.

In certain cases it is possible that after the halting of the pusher element the plate end inadvertently continues to move forward due to inertia, which reduces the cutting accuracy.

Satisfactory precision of the cut lengths may be ensured even if the last piece of plate tries to move forward in the manner described above because of its inertia, as the pusher element can be provided, at its end nearest the shear, with a clamping device to hold the plate being conveyed. This allows the plate end to be introduced into the shear precisely as far as is necessary for the specified cut length. The clamping device is then not released until the plate has reached its predetermined position. The release of the clamping device can be controlled automatically for example by a limit switch or the like operated by the pusher element.

Preferably the clamping device has an operating cylinder which not only can ensure reliable clamping but in addition can easily be controlled in its holding or released position. Further possibilities are provided by the use of electromagnets.

The clamping device itself can be jaw-shaped with the operating thrust cylinder mounted in a side aperture in the case of a device with rigid jaws. In a pincer-like device, in which at least one jaw is movable, the operating thrust cylinder is preferably pivoted to the moving pincer jaw.

In FIG. 4, the end of the pusher element 15 has connected to it two rigid jaws 28, which are open in the direction of the shear and between which the sheet 9 is inserted. The top jaw has an aperture for an operating thrust cylinder 27 which holds the sheet 9 in the position shown with its extended end 27'.

In the embodiment shown in FIG. 5 the top jaw 19 is movable, as it is pivotably connected at the point 30 with the end of the pusher element 15 and has a pincer lever 31. The operating cylinder 27 is connected to the end of the said lever and its other end is connected to a point 32 that is fixed in relation to the pusher element 15.

In FIG. 6, a schematic arrangement of control means for either of the first or second embodiment of the invention is shown.

A first control unit 33 includes the first sensor denoted by reference numbers 12, 13 as shown in FIG. 2, a switch 34 arranged to be operated by the first sensor and a control circuit 35 arranged to supply control pulses to the drive rollers 5, 6, the holding stop 11 and arms 15 of the pushing element(s). FIG. 6 shows the control means in a first arrangement in which plate is beng advanced by the drive rollers 5, 6, the light beam at 12, 13 being interrupted and the switch 34 thereby being maintained in an open position.

In this first arrangement the switch 36 is maintained in a closed position so that the drive rollers 5, 6 engage the plate and advance it through the apparatus, the switch 37 is maintained in an open position so that the stop 11 is positioned out of engagement with the plate, and the switch 38 is also maintained in an open position so that an associated first relay element 39 associated with the pusher element(s) is not energised. When the first relay element 39 is not energised the second relay element 40, which forms a switch, is open and so no current flows in its circuit which includes a pulse delay circuit 41 the output of which is connected to the control circuit 35.

When the plate has been advanced to the position shown in FIG. 1 with the end portion of the plate near the drive rollers 5, 6, the first sensor operates to close the switch 34, thereby operating the control circuit 35 to provide a control pulse to change the switches 36, 37, 38 and therefore 40) to a second arrangement opposite to the first arrangement. In the second arrangement the switch 36 is open and thereby controls the drive means to be displaced from engagement with the plate so that the arms 15, operated on closure of the switch 38, are moved (either by the arms 19 in the first embodiment or by the independent drive means in the second embodiment) to engage the end portion of the plate. At the same time the switch 37 is closed, thereby operating means for moving the stop 11 into engagement with the plate.

The pusher elements include cut-off means which in the first embodiment operate to halt each pusher element when it comes into engagement with the plate, further motion being provided by the drive rollers 5, 6 which are moved to engage the arms 15 and displace them towards the knives. In the second embodiment the cut-off means operates to prevent each arm 15 displacing the plate until all the arms have effected their independent movement to engage the plate; the arms 15 are then moved in unison by operation of their drive motors.

The pulse delay circuit 41 is set to provide an output pulse at a predetermined time after the second relay element 40 has been closed. When the control circuit 35 receives the output pulse, it operates to switch the switches 36, 37, 38 (and therefore 40) from the second arrangement back to the first arrangement shown in FIG. 6. In the first embodiment, re-closure of the switch 36 operates means for bringing the rollers 5, 6 into engagement with the arms 15, whereby the arms are displaced towards the knives to advance the plate. In the second embodiment reclosure of the switch 36 operates the independent drive motor to move the drive rollers 5, 6 back into engagement with the plate in place of the pusher elements so that the plate is advanced by the drive roller.

We claim:

1. A device for positioning the end portion of plate to be cut by a crosscut shear, comprising a primary conveying means for normally moving plate along a path of movement to be cut by a crosscut shear, pushing means normally disposed outside said path of movement and operative to engage the end portion of plate, while the end portion is still entrained by the primary conveying means, to move the end portion to the crosscut shear and a plate holding means in addition to the primary conveying means for holding the plate until the pushing means abut or engage the plate.

2. A device as claimed in claim 1, comprising a plurality of pushing means, which are independently movable to abut or engage the plate.

3. A device as claimed in claim 2, wherein the plurality of pushing means are adapted to operate in unison to move the plate.

4. A device as claimed in claim 3, and comprising means for connecting the plurality of pushing means for their operation in unison.

5. A device as claimed in claim 3 further comprising a sensor connected to first control means for stopping the primary conveying means, starting the independent movement of the pushing means until they abut or engage the plate, and actuating the holding means to hold the plate on receipt of the control signal from said sensor.

6. A device as claimed in claim 5 wherein second control means are associated with said first control means for starting the unison movement of the pushing means and actuating the holding means to release the plate a predetermined time after receipt of said control signal from said sensor.

7. A device as claimed in claim 6, wherein the second control means includes a relay element for providing a second control signal on movement of the pushing means, time delay means for delaying the second control signal by the predetermined amount and means for passing the delayed second control signal to said first control means, said first control means operating to start the unison movement of the pushing means and to actuate the holding means to release the plate a predetermined time after receipt of said control signal from said sensor.

8. A device as claimed in claim 1, further comprising a measuring element coupled to the primary conveying means, whereby the crosscut shear is controlled by the measuring element to cut the length of plate desired.

9. A device as claimed in claim 1, wherein the holding means is a stop to be fitted downstream of the crosscut shear in the path along which the plate is conveyed.

10. A device as claimed in claim 1, wherein the holding means comprises hold-downs pressing the plate against the bearing surface of a front knife holder.

11. A device as claime in claim 1, wherein the pushing means is a pivotably mounted arm guided in the longitudinal direction of a pivoted lever, whereby rams act on the pivoted lever and move it from its rest to its working position and vice versa.

12. A device as claimed in claim 11, wherein the arm is generally L-shaped in cross-section so that one limb of which can be inserted between the drive rollers.

13. A device as claimed in claim 11, wherein the pivoted levers are connected through clutches to shafts which are driven with reduction by the motors of the drive rollers.

14. A device as claimed in claim 1, wherein the pushing means is provided at its end nearest the shear with a clamping device to hold the plate being conveyed.

15. A device as claimed in claim 14, wherein the clamping device is jaw-shaped and is operated by a thrust cylinder.

16. A device as claimed in claim 15, wherein the jaws are made in one piece integral with the pushing means and have an aperture to take the thrust cylinder.

17. A device as claimed in claim 15, wherein the jaw is pincer-like, whereby the thrust cylinder is pivoted to the end of the moving pincer lever.

18. A device as claimed in claim 1, wherein the pushing means are displaceably mounted with respect to the primary conveying means on the device, and the device including means for engaging the primary conveying means and the pushing means when the pushing means engages the end portion of the plate for the transmission of a plate-moving force from the primary conveying means to the pushing means.

19. A device as claimed in claim 1, wherein the primary conveying means comprises drive rollers and means for displacing the drive rollers from a first position in which the drive rollers engage the plate and a second position spaced from the plate in which the pushing means engage the plate.

References Cited

UNITED STATES PATENTS

| | | | |
|---|---|---|---|
| 1,798,017 | 3/1931 | Free | 83—206X |
| 2,677,542 | 5/1954 | Backhouse et al. | 271—8 |
| 2,959,080 | 11/1960 | Laufer | 83—206 |
| 2,966,086 | 12/1960 | Sjostrom | 83—206X |
| 3,318,179 | 5/1967 | Elsas | 83—208X |

FRANK T. YOST, Primary Examiner

U.S. Cl. X.R.

83—208, 209, 251, 268, 418